United States Patent
Beatty et al.

(10) Patent No.: US 7,476,460 B2
(45) Date of Patent: Jan. 13, 2009

(54) THIN METAL OXIDE FILM AND METHOD OF MAKING THE SAME

(75) Inventors: Christopher C. Beatty, Albany, OR (US); David Punsalan, Eugene, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 599 days.

(21) Appl. No.: 10/696,447

(22) Filed: Oct. 29, 2003

(65) Prior Publication Data

US 2005/0095480 A1   May 5, 2005

(51) Int. Cl.
*H01M 8/02* (2006.01)
*H01M 4/88* (2006.01)

(52) U.S. Cl. .................. 429/42; 429/40; 429/44; 427/115; 502/101

(58) Field of Classification Search ............ 429/30
See application file for complete search history.

(56) References Cited

U.S. PATENT DOCUMENTS

| | | | |
|---|---|---|---|
| 4,397,671 A | 8/1983 | Vong | |
| 4,767,518 A | 8/1988 | Maskalick et al. | |
| 4,943,496 A * | 7/1990 | Okada et al. | 429/45 |
| 4,960,618 A | 10/1990 | Tanitsu et al. | |
| 5,021,304 A | 6/1991 | Ruka et al. | |
| 5,100,764 A | 3/1992 | Paulson et al. | |
| 5,137,749 A | 8/1992 | Yamazaki et al. | |
| 5,175,027 A | 12/1992 | Holmes-Farley et al. | |
| 5,175,063 A * | 12/1992 | Ishihara et al. | 429/32 |
| 5,182,143 A | 1/1993 | Holmes-Farley et al. | |
| 5,275,843 A | 1/1994 | Hirano | |
| 5,393,907 A | 2/1995 | Hashimoto et al. | |
| 5,494,700 A | 2/1996 | Anderson et al. | |
| 5,567,755 A | 10/1996 | Hashimoto et al. | |
| 5,686,151 A | 11/1997 | Imai et al. | |
| 5,776,236 A | 7/1998 | Neuman et al. | |
| 5,939,197 A | 8/1999 | Blohowiak et al. | |
| 6,016,689 A | 1/2000 | Bright et al. | |
| 6,117,487 A | 9/2000 | Akutsu et al. | |
| 6,139,985 A * | 10/2000 | Borglum et al. | 429/41 |
| 6,165,553 A | 12/2000 | Chen et al. | |
| 6,172,152 B1 | 1/2001 | Kim et al. | |
| 6,187,157 B1 | 2/2001 | Chen et al. | |
| 6,207,280 B1 | 3/2001 | Atarashi et al. | |
| 6,251,473 B1 | 6/2001 | Wang et al. | |
| 6,432,570 B1 | 8/2002 | Ippommatsu et al. | |

(Continued)

FOREIGN PATENT DOCUMENTS

EP    0329890    8/1989

(Continued)

OTHER PUBLICATIONS

Materials Safety Data Sheet (MSDS) for UPC Universal Protective Coating, ATMI Materials, Ltd., Jun. 12, 2001; pp. 1-8.

*Primary Examiner*—Jonathan Crepeau
*Assistant Examiner*—Tony Chuo (57) ABSTRACT

A thin metal oxide film includes a solution of one or more metal salts and one or more water soluble polymers. A mechanism is provided for converting the metal salt(s) and water soluble polymer(s) solution into the thin metal oxide film.

19 Claims, 5 Drawing Sheets

U.S. PATENT DOCUMENTS

| | | | |
|---|---|---|---|
| 6,475,657 B1 | 11/2002 | Del Gallo et al. | |
| 6,485,619 B2 | 11/2002 | Sasaki | |
| 6,492,051 B1 * | 12/2002 | Gopalan et al. | 429/31 |
| 6,524,421 B1 | 2/2003 | Chen et al. | |
| 6,562,461 B1 | 5/2003 | Clough | |
| 6,589,453 B1 | 7/2003 | Saitoh et al. | |
| 6,589,457 B1 | 7/2003 | Li et al. | |
| 6,902,790 B1 * | 6/2005 | Hata et al. | 428/141 |
| 2002/0145134 A1 | 10/2002 | Olding et al. | |
| 2002/0155335 A1 * | 10/2002 | Kearl | 429/30 |
| 2002/0187389 A1 * | 12/2002 | Wallin et al. | 429/44 |
| 2003/0012995 A1 * | 1/2003 | Hara et al. | 429/32 |
| 2003/0049943 A1 | 3/2003 | Choi et al. | |
| 2003/0077456 A1 | 4/2003 | Atkins et al. | |

FOREIGN PATENT DOCUMENTS

| | | |
|---|---|---|
| EP | 0669296 | 8/1995 |

* cited by examiner

THIN METAL OXIDE FILM AND METHOD OF MAKING THE SAME

BACKGROUND OF THE INVENTION

The present invention relates generally to metal oxide films, and more particularly to metal oxide films formed from metal salts and water soluble polymers. These films may be used in many applications, one example of which is in fuel cells.

Fuel cells use an electrochemical energy conversion of fuel (including but not limited to hydrogen, propane, methane, carbon monoxide, and the like) and oxidant(s) into electricity and heat. It is anticipated that fuel cells may be able to replace primary and secondary batteries as a portable power supply. In fuel cells, the fuel (usually containing a source of hydrogen) is oxidized typically with a source of oxygen to produce (primarily) water and carbon dioxide. The oxidation reaction at the anode, which liberates electrons, in combination with the reduction reaction at the cathode, which consumes electrons, results in a useful electrical voltage and current through the load.

As such, fuel cells provide a direct current (DC) voltage that may be used to power motors, lights, electrical appliances, etc. A solid oxide fuel cell (SOFC) is one type of fuel cell that may be useful in portable or non-portable applications.

The material properties which are generally desirable in order to obtain high performing fuel cell devices, also make fabrication of those fuel cell devices a significant challenge.

SOFC's often contain electrolytes and electrodes made from metal oxide films. Deposition of thin metal oxide films has been accomplished with many methods, including atomic layer deposition (ALD), Physical Vapor Deposition (PVD), Chemical Vapor Deposition (CVD), Plasma Enhanced Chemical Vapor Deposition (PECVD), Molecular Beam Epitaxy (MBE), Metal Organic Chemical Vapor Deposition (MOCVD), sputtering, evaporation, and various wet chemical methods. The wet chemical methods offer the advantages of low cost equipment and high throughput. However, some examples of deposition methods and drawbacks associated therewith include the following.

Sol-gel is one of the most common wet deposition methods, but suffers from high material cost and very sensitive process conditions, including a controlled atmosphere. Sol-gel reagents are generally used in carefully controlled regimes of pH and temperature. Additionally, there is generally a narrow process window to produce a coherent film.

A metal-organic deposition (MOD) method is another wet method. MOD generally requires inexpensive materials, but has poor wetting characteristics due in part to the glycols used. Further, the MOD process generally requires a time-consuming chelation process.

MBE and ALD methods generally involve expensive equipment and materials. CVD, PECVD, and MOCVD generally use costly equipment and volatile precursors that may not be readily available. Sputtering and evaporation deposition techniques generally require expensive equipment and stoichiometries which may in some instances be difficult to control.

SUMMARY OF THE INVENTION

The present invention solves the drawbacks enumerated above by providing a thin metal oxide film including a solution of one or more metal salts and one or more water soluble polymers. A mechanism is provided for converting the metal salt(s) and water soluble polymer(s) solution into the thin metal oxide film.

BRIEF DESCRIPTION OF THE DRAWINGS

Objects, features and advantages of the present invention will become apparent by reference to the following detailed description and drawings, in which like reference numerals correspond to similar, though not necessarily identical components. For the sake of brevity, reference numerals having a previously described function may not necessarily be described in connection with subsequent drawings in which they appear.

DETAILED DESCRIPTION OF THE EMBODIMENTS

Embodiments of the present invention describe novel methods for fabricating metal oxide films. Although the present invention is not limited to fuel cells, or any particular type of fuel cell, the various methods described may advantageously be used to fabricate various solid oxide fuel cell elements, such as electrolytes and electrodes.

Referring now to an embodiment of the present invention, a method of making a metal oxide film includes the step of preparing a first solution by dissolving at least one metal salt into de-ionized water.

It is to be understood that the metal salt may be any suitable metal salt(s), including but not limited to acetates, nitrates, halides, and/or sulfates of cerium, samarium, indium, gadolinium, praseodymium, yttrium, zirconium, strontium, and/or cobalt, and/or mixtures thereof. In an alternate embodiment, the metal salt is cerium nitrate, samarium nitrate, gadolinium nitrate, praseodymium nitrate, cerium chloride, samarium chloride, gadolinium chloride, praseodymium chloride, indium tin oxide, yttria-stabilized zirconia (YSZ), samarium strontium cobalt oxide, gadolinium doped ceria, and/or mixtures thereof.

Nitrates may generally be used because they provide high solubility. However, the de-watering process for nitrates may in some instances be a disruptive process that may lower the amount of solution that is successfully deposited when spin coating is used. In an embodiment of the present invention, a chloride salt may in some instances advantageously result in a more successful deposition, with perhaps a slight loss in solubility.

In a non-limitative embodiment, two metal salts are used to make the first solution. It is to be understood that each metal salt used may individually be substantially completely dissolved into a solvent, such as de-ionized water. Examples of other suitable solvents include, but are not limited to water plus an additive such as, alcohols, acids, bases, and/or polar organics, and/or mixtures thereof. Some non-limitative examples of these additives include ethanol, nitric acid, acetic acid, hydrofluoric acid, hydrochloric acid, ammonia, acetone, and/or tetrahydrofuran (THF).

These two metal salt solutions may be titrated to a known concentration to achieve a substantially exact stoichiometry. Any error in final stoichiometries may generally be due to variable waters of hydration. This error may be eliminated if the metal salts are dissolved individually into separate containers of de-ionized water and titrated for concentration. It is to be understood that these individual metal salt solutions may then be combined at a pre-determined ratio to form the first solution.

The method of preparing a metal oxide film according to an embodiment of the present invention further includes the step of preparing a second solution that is an aqueous polymer solution. In an embodiment, the second solution is prepared by dissolving a water soluble polymer in a suitable solvent, such as water and/or the like.

Some non-limitative examples of the water soluble polymer include, but are not limited to polyvinyl alcohols, starches, hydrocolloids, cellulose ethers, polyethylene oxides, polyacrylates, polyacrylamides, polyamines, and/or polyimines, and/or mixtures thereof.

In an embodiment of the present invention, the water soluble polymer is polyvinyl alcohol (PVA). It is to be understood that any suitable PVA may be used. One such suitable PVA is available commercially under the trade name ELVANOL from Dupont, located in Wilmington, Del.

It is to be further understood that ethylene glycol may generally not be suitable for use in the second solution. Ethylene glycol would need to be polymerized and, even after such polymerization, the resulting polyethyleneglycol (PEG) exhibits generally poor wetting characteristics on the substrate.

Suitable solvents for the second solution of the water soluble polymer include but are not limited to water, and/or isopropyl alcohol, and/or mixtures thereof. In an embodiment, the water is purified and/or deionized. However, it is to be understood that the water may be unpurified and/or non-deionized in some instances if impurities contained in the water are not harmful to the final device.

A non-limitative embodiment of the second solution includes about 10% PVA by weight in about 75% water and about 15% isopropyl alcohol. The second solution may also be purchased as a pre-made solution, which is commercially available under the tradename UPC Universal Protective Coating, from ATMI Materials, Ltd., Liquid Operations in Burnet, Tex.

The method of making a metal oxide film according to the present invention further includes the step of combining the first and second solutions together at a predetermined ratio to form the third solution. It is to be understood that by varying the ratio of first solution to second solution, the viscosity of the third solution changes. In an embodiment of the present invention, the viscosity of the third solution may be adjusted by varying this ratio to render it sufficient for spin coating, spray coating, dip coating, and/or other suitable deposition techniques. In a non-limitative example, a third solution with a viscosity ranging between about 10 cp (centipoise) and about 100 cp may be suitable for deposition by spin coating.

An alternate embodiment of the method of the present invention includes the step of preparing a single solution containing the metal salt(s) and the polymer(s) in a solvent. It is to be understood that a single solution may be made if the ratio of metal salt(s) to polymer(s) is known such that the desired viscosity may be achieved. In this embodiment, the desired amounts of polymer(s) and metal salts(s) may be added directly to the solvent. It is to be understood that suitable materials recited herein for the metal salt(s) and polymer(s) may be used in this embodiment. In an embodiment of the present invention, the viscosity of this single solution may be adjusted by varying the ratio of metal salt(s) to polymer(s) to render it sufficient for spin coating, spray coating, dip coating and/or other suitable deposition techniques. In a non-limitative example, the single solution with a viscosity ranging between about 10 cp and about 100 cp may be suitable for deposition by spin coating.

Figure 1:
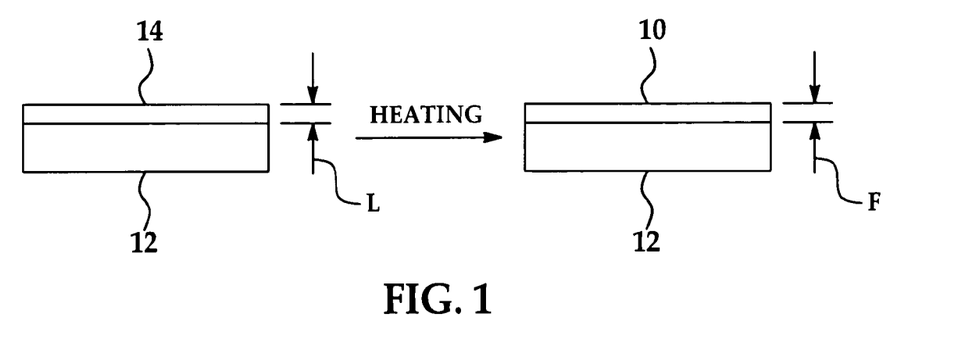
FIG. 1 is a schematic diagram showing some steps of an embodiment of the present invention.

Referring now to FIG. 1, in an embodiment, after the third solution is prepared with the desired viscosity, a layer 14 of the third solution is applied to a substrate 12. It is to be understood that any suitable substrate 12 may be chosen. Some non-limitative examples of suitable substrates 12 include single crystal silicon, polycrystalline silicon, silicon oxide containing dielectric substrates, alumina, sapphire, ceramics, cermets (one non-limitative example of which is Ni-Yttria-Stabilized Zirconia), and/or mixtures thereof.

Any appropriate process for depositing the solution onto the substrate 12 may be chosen. An embodiment of the present invention uses spin coating, spray coating, and/or dip coating deposition. In a non-limitative example, spin coating at a rate ranging between about 500 rpm and about 5000 rpm is used to deposit the third solution layer 14 onto the substrate 12. It is to be understood that any suitable thickness L per spin may be achieved, depending upon various process and composition parameters. In an embodiment, a thickness L ranging between about 1000 angstroms and about 5000 angstroms (0.1 µm to about 0.5 µm) per spin is achieved. Advantageously, it is to be understood that embodiment(s) of the present invention generally do not require the use of adhesion promoters in the deposition step.

In an embodiment of the present invention, the method further includes the step of heating the substrate 12, which has the third solution layer 14 thereon, to oxidize the metal salt to form a metal oxide film 10. The heating step may be accomplished by any suitable means, including, but not limited to, hotplate heating and/or firing.

In an embodiment, the heating step takes place at a temperature ranging between about 400° C. and about 1200° C. In a further embodiment, the temperature ranges between about 540° C. and about 1050° C.

The inventors have unexpectedly and fortuitously discovered that in determining the heating temperature, it may be beneficial to first determine and match the oxidation temperature of the metal in the metal salt with that of the water soluble polymer. In a non-limitative example, the third solution is formed from PVA and cerium chloride, and the heating temperature is about 540° C., just above the oxidation temperatures of the selected metal salt and water soluble polymer (as discussed below in reference to FIGS. 2 and 4).

In an embodiment, during the heating step, the third solution may undergo various processes. These processes include, but are not limited to, evaporation of solvents and labile water, loss of water(s) of hydration, pyrolysis of the solvent, transformation of organics to volatile by-products, and oxidation of the metal salt to oxide, such that the method results in the metal oxide film 10.

According to an embodiment of the present invention, the metal oxide film 10 has a thickness F ranging between about 0.05 μm and about 5.0 μm. In a further embodiment, the metal oxide film 10 thickness F is between about 0.1 μm and about 1.5 μm.

In an alternate embodiment of the present invention, the method optionally includes the step of depositing a subsequent layer (not shown) of the third solution on the metal oxide film 10 and then heating the metal oxide film 10 having the subsequent layer thereon. This cycle (deposting a layer of the third solution and then heating) may be repeated as many times as necessary and/or desired, thereby forming a metal oxide film 10 having a thickness F as desired and/or necessitated by a particular end use. In an alternate embodiment of the present invention in which the cycle is repeated, the formed metal oxide film 10 may range in thickness between about 5.0 μm and about 20.0 μm.

Figure 2:
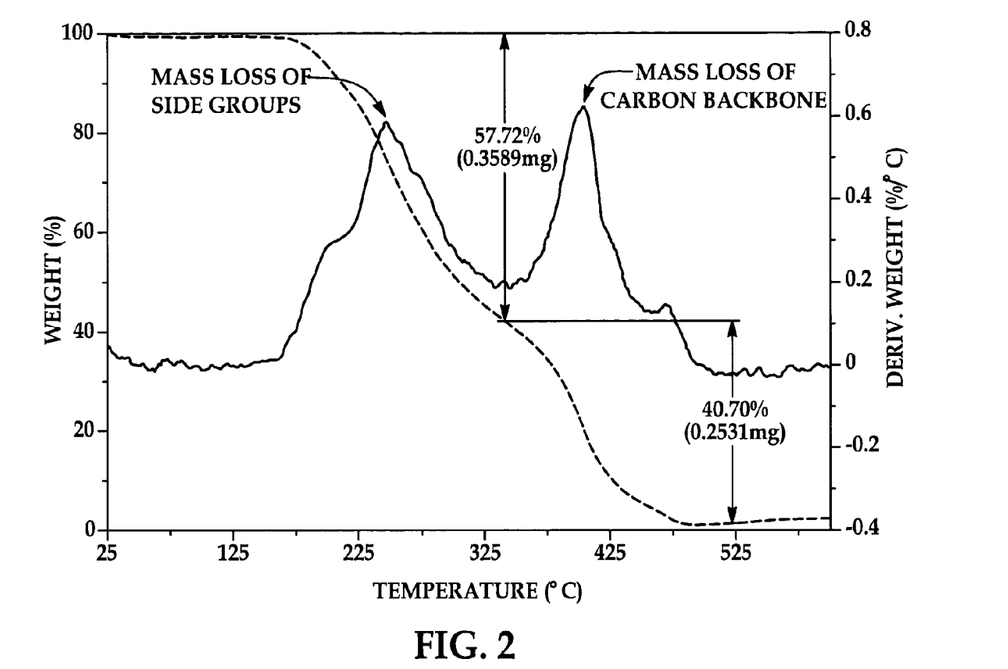
FIG. 2 is a graph of the thermo-gravimetric analysis of polyvinyl alcohol.

Referring now to FIG. 2, a graph of the thermo-gravimetric analysis of PVA shows that PVA oxidizes at temperatures ranging between about 410° C. and about 440° C. The solid line corresponds to the derivative weight (%/° C.), and the dotted line corresponds to the weight (%).

Figure 3:
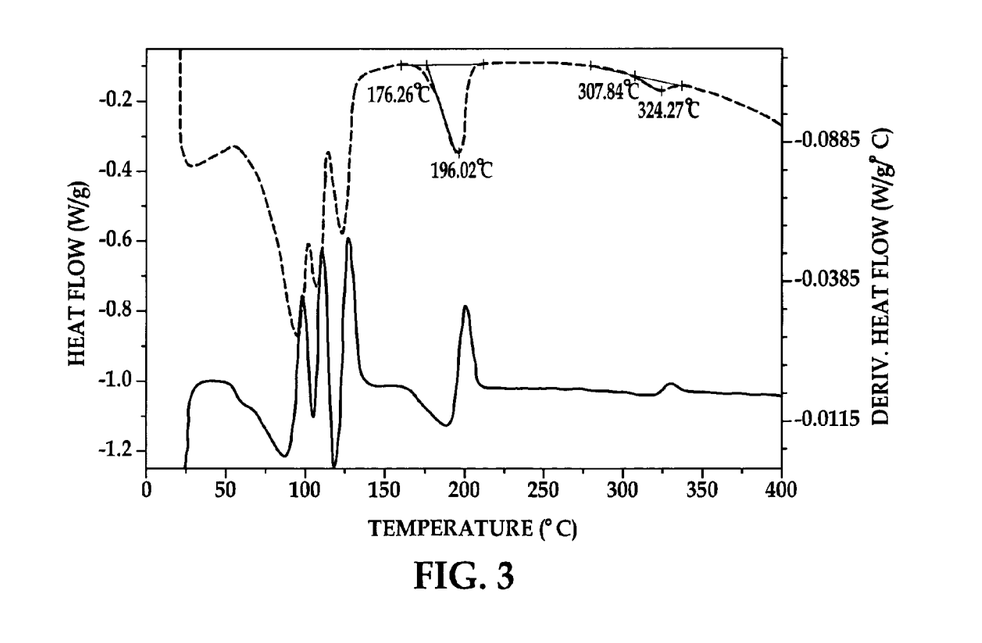
FIG. 3 is a graph of the thermo-gravimetric analysis of samarium chloride without a polymer.

Referring now to FIG. 3, a graph of the thermo-gravimetric analysis of SmCl₃ shows that the chloride of the samarium chloride burns off to form the oxide. The solid line corresponds to the derivative heat flow (W/g/° C.), and the dotted line corresponds to the heat flow (W/g).

Figure 4:
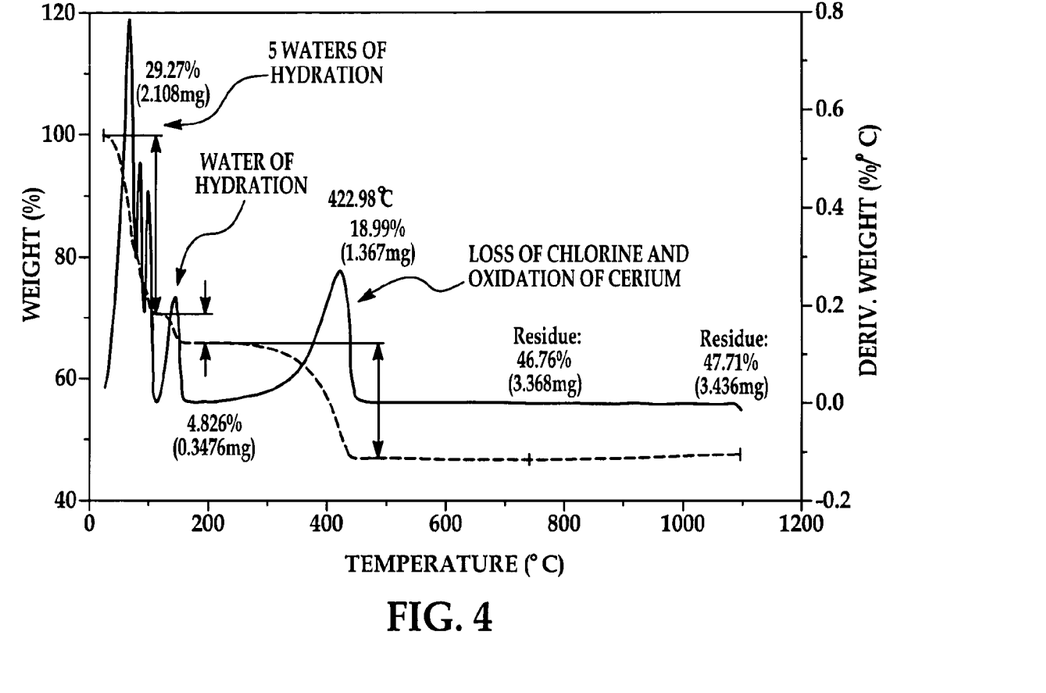
FIG. 4 is a graph of the thermo-gravimetric analysis of cerium chloride without a polymer.

Referring now to FIG. 4, a graph of the thermo-gravimetric analysis of CeCl₃ shows that cerium, similar to PVA, also oxidizes at temperatures between about 410° C. and about 440° C. The solid line corresponds to the derivative weight (%/° C.) and the dotted line corresponds to the weight (%).

The method of making a metal oxide film 10 according to an embodiment of the present invention optionally includes the step of modifying a grain structure of the formed metal oxide film 10. This modification may be accomplished with additional heating processes. The additional heating processes may take place at any suitable temperatures sufficient to modify the grain structure as desired. In an embodiment, these temperatures range between about 400° C. and about 1500° C. It is to be understood that as the temperature is increased, the grain structure grows larger. It is to be further understood that the grain structure modifications generally do not have much effect on the thickness F of the metal oxide film 10. In an embodiment however, the thickness F of the metal oxide film 10 may limit how large the grains will grow. In a non-limitative example, once a single grain structure is modified across the thickness F of the metal oxide film 10, additional grain structures are generally more difficult to grow.

To further illustrate the present invention, the following example is given. It is to be understood that this example is provided for illustrative purposes and is not to be construed as limiting the scope of the present invention.

EXAMPLE

About 5.0 g of cerium chloride and about 1.35 g of samarium chloride were mixed with about 20 mL of de-ionized water to form a first solution. About 10% by weight PVA, about 75% by weight water and about 15% by weight isopropanol were mixed to form a second solution of about 20 mL. The first solution was mixed with the second solution to form a third solution having a viscosity of 20 cp. The third solution was spin coated onto a silicon substrate for 30 seconds at 3000 rpm, resulting in a film layer of about 1000 Å. The third solution covered substrate was heated at about 540° C. to form a samarium doped ceria (SDC) mixed metal oxide film. The metal oxide film was further fired at up to about 1050° C. to modify the grain structure.

Figure 5:
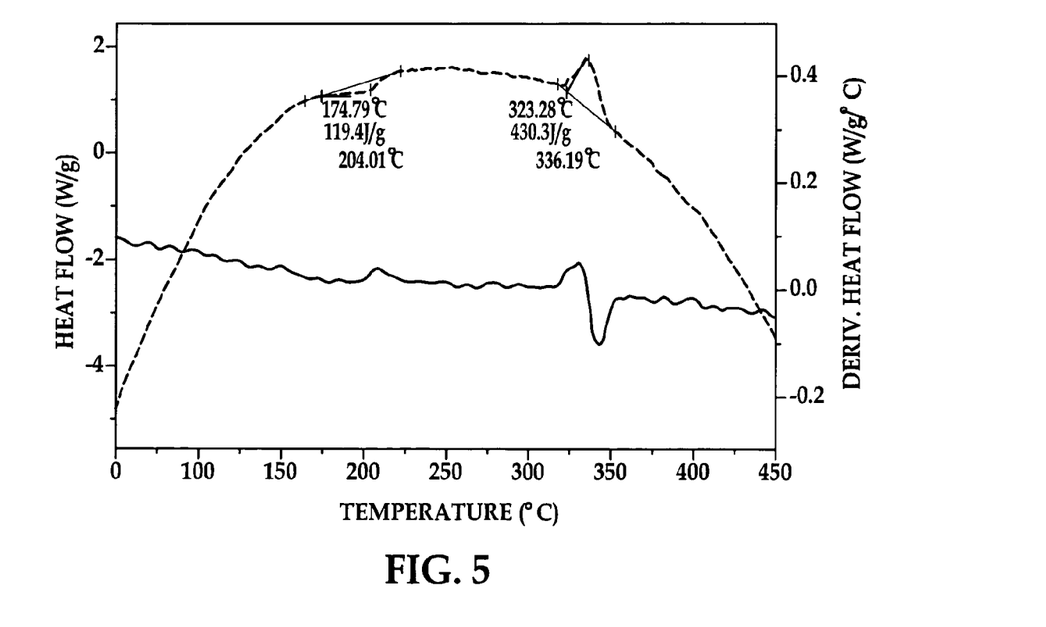
FIG. 5 is a graph of the thermo-gravimetric analysis of a samaria doped ceria solution before being heated.

A thermo-gravimetric analysis graph of the third solution before deposition and heating is shown in FIG. 5. The solid line corresponds to the derivative heat flow (W/g/° C.), and the dotted line corresponds to the heat flow (W/g). Without being bound to any theory, it is believed that this graph may illustrate that the third solution may destabilize the cerium therein towards oxidation.

Figure 6:
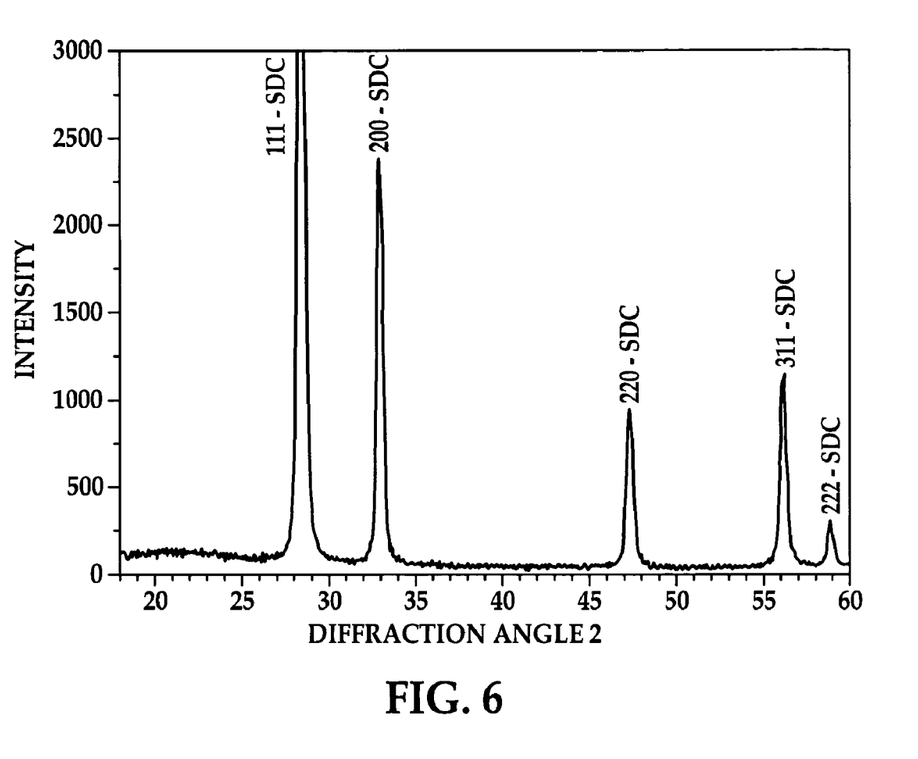
FIG. 6 is an X-ray diffraction graph of a fired samaria doped ceria film according to an embodiment of the present invention.

FIG. 6 is a graph of an X-Ray diffraction of the fired samarium doped ceria film, which shows that SDC is indeed present in the film.

Figure 7:
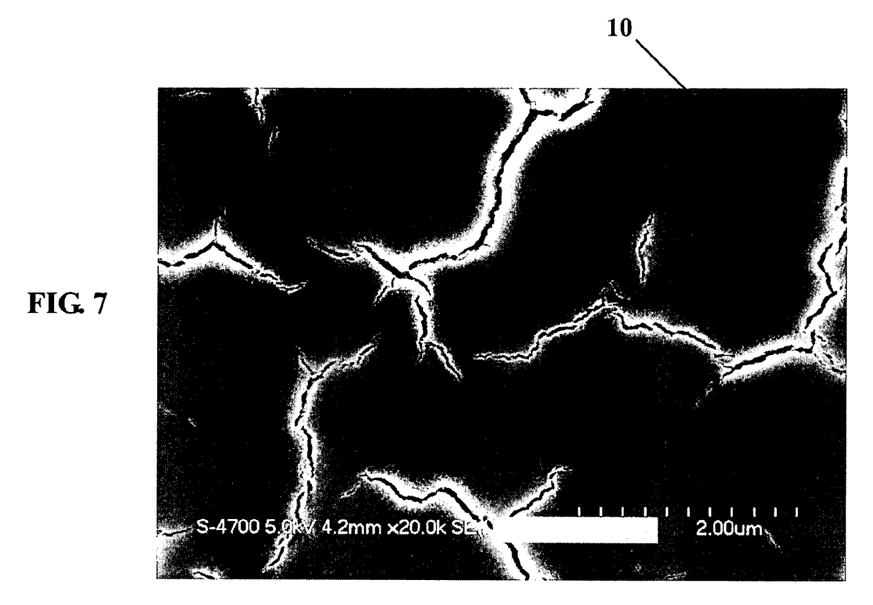
FIG. 7 is a scanning electron micrograph (SEM) at 20,000× magnification of a top view of a fired samarium doped ceria film according to an embodiment of the present invention.

FIG. 7 is a SEM of a top view of the fired samarium doped ceria metal oxide film 10. The SDC film 10 may be useful as an anode material.

Without being bound to any theory, it is believed that cracking in the film 10 may generally result from a combination of shrinking/drying stresses and differential thermal expansion. It is to be understood that cracks may be advantageous in electrodes (both anodes and cathodes), by enhancing the surface area for catalytic reactions. If the cracks are not desired (as for example, if the film were formed from a material suitable for use as an electrolyte), it is to be understood that the cracks in the film 10 may be minimized and/or substantially eliminated by varying the third solution composition and/or by including additives in the third solution. In a non-limitative example, a third solution with a lower viscosity is spun onto the substrate 12 at a high speed and then heated to form a thinner film that has substantially no cracks. Further, additional layers of the lower viscosity third solution may be added to achieve a thicker, substantially crack-free film 10.

Figure 8:
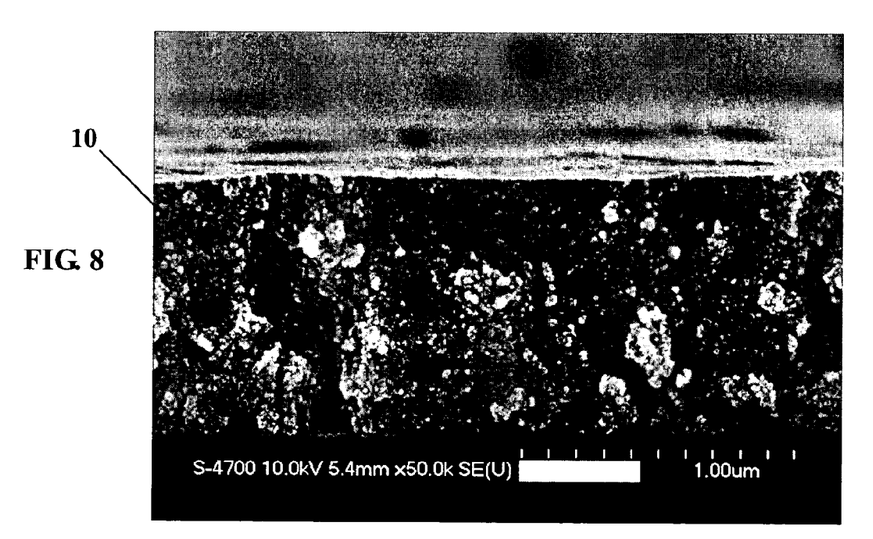
FIG. 8 is a SEM at 50,000× magnification of a cross-sectional view of a fired samarium doped ceria film according to an embodiment of the present invention.

FIG. 8 shows a SEM cross-sectional view of the SDC film of FIG. 7.

It is to be understood that embodiment(s) of the inventive method may be used to make metal oxide films for a variety of applications, including, but not limited to, electrolytes and electrodes useful in fuel cells, ion conducting gas separation membranes, and/or battery electrodes.

Figure 9:
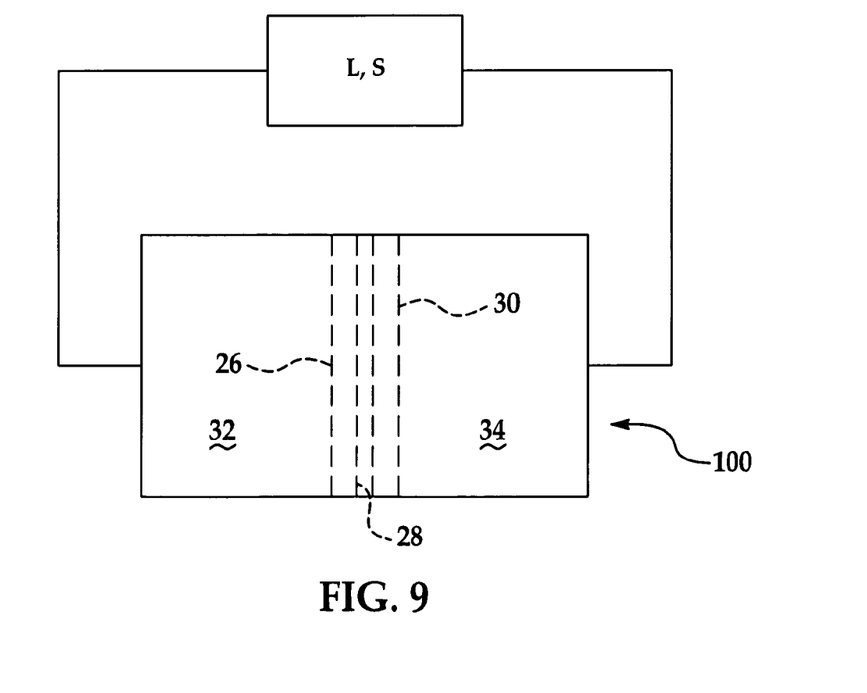
FIG. 9 is a schematic view of a fuel cell according to an embodiment of the present invention.

Referring now to FIG. 9, in an embodiment of the present invention, a fuel cell 100 includes at least one electrode in electrochemical contact with an electrolyte 28. It is to be understood that the electrode may be an anode 26 or a cathode 30. It is to be further understood that the electrolyte 28, the anode 26, and/or the cathode 30 may be a thin metal oxide film according to embodiment(s) of the present invention.

FIG. 9 is a simplified schematic diagram of a dual chamber fuel cell 100. It is to be understood that fuel cell may also be a single chamber fuel cell.

Further, it is to be understood that the fuel cell 100 may be one of solid oxide fuel cells.

In the fuel cell 100, oxidants 34 are carried to the cathode 30, and reactants 32 are carried to the anode 26. In an embodiment, the reactants 32 are fuels, and the oxidants 34 are one of oxygen, air, and mixtures thereof. It is to be understood that any suitable fuel/reactant 32 may be used with the fuel cell 100 of the present invention. In an embodiment, the fuel/reactant 32 is selected from at least one of hydrogen, methane, ethane, propane, butane, pentane, methanol, ethanol, higher straight chain or mixed hydrocarbons, for example, natural gas or gasoline (low sulfur hydrocarbons may be desirable, e.g. low sulfur gasoline, low sulfur kerosene, low sulfur diesel), and mixtures thereof. In an alternate embodiment, the fuel/reactant 32 is selected from the group consisting of butane, propane, methane, pentane, and mixtures thereof. Suitable fuels may be chosen for their suitability for internal direct reformation, suitable vapor pressure within the operating temperature range of interest, and like parameters.

It is to be understood that if fuel cell 100 is a single chamber fuel cell, a gaseous mixture of reactant 32 and oxidant 34 may be directed toward the anode 26 and/or the cathode 30.

An embodiment of a method of using fuel cell 100 includes the step of operatively connecting the fuel cell 100 to electrical load L and/or to electrical storage device S. The electrical load L may include many devices, including, but not limited to any or all of computers, portable electronic appliances (e.g. portable digital assistants (PDAs), portable power tools, etc.), and communication devices, portable or otherwise, both consumer and military. The electrical storage device S may include, as non-limitative examples, any or all of capacitors, batteries, and power conditioning devices. Some exemplary power conditioning devices include uninterruptible power supplies, DC/AC converters, DC voltage converters, voltage regulators, current limiters, etc.

It is also contemplated that the fuel cell 100 of the present invention may, in some instances, be suitable for use in the transportation industry, e.g. to power automobiles, and in the utilities industry, e.g. within power plants.

Embodiments of the present invention may provide many advantages, examples of which include, but are not limited to the following. An embodiment of the method of the present invention advantageously results in the use of low cost materials and equipment. Further, in an embodiment, the use of inexpensive metal salts may advantageously result in wide process latitudes in normal laboratory and manufacturing conditions, generally without requiring carefully controlled regimes of pH and temperature. Additionally, in an embodiment of the present invention, generally the use of polymers, rather than glycols, advantageously results in better substrate wetting. In an embodiment of the method of the present invention, time-consuming chelation processes are generally avoided. Still further, the method of the present invention generally advantageously results in a fast, efficient process of making metal oxide films without losing high throughput.

While several embodiments of the invention have been disclosed in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A fuel cell, comprising:
   at least one electrode operatively disposed in the fuel cell; and
   an electrolyte in electrochemical contact with the at least one electrode;
   wherein the electrode includes a metal oxide film established on a substrate selected from single crystal silicon, polycrystalline silicon, and silicon oxide containing dielectric substrates, the metal oxide film having at least one crack formed therein during a process for forming the metal oxide film, the process comprising the steps of:
      preparing a first solution having at least one metal salt dissolved therein;
      preparing a second solution having a water soluble polymer dissolved therein;
      combining the first solution and the second solution at a predetermined ratio to form a third solution;
      depositing a layer of the third solution on the substrate; and
      heating the substrate having the third solution layer thereon at a temperature sufficient to oxidize the at least one metal salt to form the solution-based metal oxide film;
   wherein the presence of the at least one crack in the metal oxide film enhances the surface area of the metal oxide film for one or more catalytic reactions in the fuel cell.

2. The fuel cell as defined in claim 1 wherein the electrode is selected from an anode and a cathode.

3. The fuel cell as defined in claim 1 wherein the first solution comprises at least two metal salts, the at least two metal salts having been dissolved individually into water, and combined at a predetermined ratio to form the first solution.

4. The fuel cell as defined in claim 1 wherein the second solution comprises the water soluble polymer dissolved in a solvent.

5. The fuel cell as defined in claim 4 wherein the solvent is at least one of water or isopropyl alcohol.

6. The fuel cell as defined in claim 5 wherein the water soluble polymer is polyvinylalcohol.

7. The fuel cell as defined in claim 6 wherein the at least one metal salt is at least one of cerium nitrate, samarium nitrate, gadolinium nitrate, praseodymium nitrate, cerium chloride, samarium chloride, gadolinium chloride, praseodymium chloride, indium tin oxide, yttria-stabilized zirconia (YSZ), samarium strontium cobalt oxide (SSCO), gadolinium doped ceria, or mixtures thereof.

8. The fuel cell as defined in claim 1 wherein the at least one metal salt is at least one of acetates, nitrates, halides, and sulfates of at least one of cerium, samarium, indium, gadolinium, praseodymium, yttrium, zirconium, strontium, and cobalt, or mixtures thereof.

9. The fuel cell as defined in claim 1 wherein the water soluble polymer is at least one of polyvinyl alcohols, starches, hydrocolloids, cellulose ethers, polyethylene oxides, polyacrylates, polyacrylamides, polyamines, polyimines, or mixtures thereof.

10. The fuel cell as defined in claim 9 wherein the water soluble polymer is polyvinyl alcohol.

11. The fuel cell as defined in claim 1 wherein the predetermined ratio is varied to achieve a viscosity of the third solution which is sufficient for deposition by at least one of spin coating, spray coating, or dip coating.

12. The fuel cell as defined in claim 1 wherein the depositing step is accomplished by at least one of spin coating, spray coating, or dip coating.

13. The fuel cell as defined in claim 1 wherein the heating step is accomplished at a temperature ranging between about 400° C. and about 1200° C.

14. The fuel cell as defined in claim 1 wherein the solution-based metal oxide film has a thickness ranging between about 0.05 μm and about 5.0 μm.

15. An electronic device, comprising:
    a load; and
    the fuel cell of claim 1 connected to the load.

16. A method for using the fuel cell as defined in claim 1, comprising the step of:
    operatively connecting the fuel cell to at least one of an electrical load and an electrical storage device.

17. The method as defined in claim 16 wherein the at least one electrode is one of an anode or a cathode.

18. A fuel cell, comprising:
    at least one electrode operatively disposed in the fuel cell; and
    an electrolyte in electrochemical contact with the at least one electrode;
    wherein the electrode includes a film consisting essentially of a metal oxide established on a substrate, the film having at least one crack formed therein during a process for forming the film, the process comprising the steps of:
preparing a first solution having at least one metal salt dissolved therein;
preparing a second solution having a water soluble polymer dissolved therein;
combining the first solution and the second solution at a predetermined ratio to form a third solution;
depositing a layer of the third solution on the substrate; and
heating the substrate having the third solution layer thereon at a temperature sufficient to oxidize the at least one metal salt to form the solution-based metal oxide film;
wherein the presence of the at least one crack in the film enhances the surface area of the film for one or more catalytic reactions in the fuel cell.

19. A fuel cell, comprising:
at least one electrode operatively disposed in the fuel cell; and
an electrolyte in electrochemical contact with the at least one electrode;
wherein the electrode includes a metal oxide film established on a substrate selected from alumina and sapphire, the metal oxide film including at least one crack formed therein during a process for forming the film, the process comprising the steps of:
preparing a first solution having at least one metal salt dissolved therein;
preparing a second solution having a water soluble polymer dissolved therein;
combining the first solution and the second solution at a predetermined ratio to form a third solution;
depositing a layer of the third solution on the substrate; and
heating the substrate having the third solution layer thereon at a temperature sufficient to oxidize the at least one metal salt to form the solution-based metal oxide film;
wherein the presence of the at least one crack in the metal oxide film enhances the surface area of the metal oxide film for one or more catalytic reactions in the fuel cell.

* * * * *